United States Patent
Zanganeh et al.

(10) Patent No.: US 9,644,838 B2
(45) Date of Patent: May 9, 2017

(54) HIGH PRESSURE FOSSIL FUEL OXY-COMBUSTION SYSTEM WITH CARBON DIOXIDE CAPTURE FOR INTERFACE WITH AN ENERGY CONVERSION SYSTEM

(75) Inventors: Kourosh Etemadi Zanganeh, Ottawa (CA); William John Pearson, Woodlawn (CA); Milenka Mitrovic, Gatineau (CA); Ahmed Shafeen, Kanata (CA)

(73) Assignee: HER MAJESTY THE QUEEN IN RIGHT OF CANADA AS REPRESENTED BY THE MINISTER OF NATURAL RESOURCES, Ottawa, Ontario (CA)

(*) Notice: Subject to any disclaimer, the term of this patent is extended or adjusted under 35 U.S.C. 154(b) by 503 days.

(21) Appl. No.: 14/119,727

(22) PCT Filed: May 24, 2011

(86) PCT No.: PCT/CA2011/000593
§ 371 (c)(1),
(2), (4) Date: Nov. 22, 2013

(87) PCT Pub. No.: WO2012/159189
PCT Pub. Date: Nov. 29, 2012

(65) Prior Publication Data
US 2014/0080073 A1    Mar. 20, 2014

(51) Int. Cl.
*F23D 1/00* (2006.01)
*F02C 3/22* (2006.01)
(Continued)

(52) U.S. Cl.
CPC ............... *F23D 1/005* (2013.01); *F02C 3/22* (2013.01); *F02C 3/28* (2013.01); *F02C 3/34* (2013.01);
(Continued)

(58) Field of Classification Search
CPC .... F23D 1/005; F02C 3/22; F02C 3/28; F02C 3/34; F02C 3/30; F23C 9/00; F23C 1/00;
(Continued)

(56) References Cited

U.S. PATENT DOCUMENTS 3,957,418 A    5/1976    Sata
4,443,228 A *  4/1984    Schlinger ............... C01B 3/363
                                                         239/112
(Continued)

FOREIGN PATENT DOCUMENTS

CN    1754065 A    3/2006
CN    1761588 A    4/2006
(Continued)

OTHER PUBLICATIONS

"JP_2011256818_A_M—Machine Translation.pdf", Machine Translation, JPO, Dec. 22, 2016.*
(Continued)

*Primary Examiner* — Gregory Huson
*Assistant Examiner* — Daniel E Namay
(74) *Attorney, Agent, or Firm* — Flynn, Thiel, Boutell & Tanis, P.C.

(57) ABSTRACT

A combustion system for operational connection to an energy conversion system and a method of providing thermal energy to the energy conversion system. The system comprises a combustor to be oxy-fired at above atmospheric pressure, using solid, liquid or gaseous fuels, with a supply of oxygen and supercritical carbon dioxide. The combustion gases from the combustor are delivered to a heat exchanger (Continued)

which interfaces with the energy conversion system. Temperatures in the combustor, and the delivery temperature to the heat exchanger, are controlled by selective recirculation of at least part of the combustion gases to the combustor, and by modulating the supply of oxygen and fuel to the combustor. Any combustion gases which are not recirculated are processed to separate carbon dioxide for use or sequestration. The system and method substantially eliminate emissions of carbon dioxide, while providing a highly efficient supply of thermal energy to the energy conversion system.

43 Claims, 5 Drawing Sheets

(51) Int. Cl.
- F02C 3/34 (2006.01)
- F23L 7/00 (2006.01)
- F23L 15/00 (2006.01)
- F02C 3/28 (2006.01)
- F23J 15/00 (2006.01)
- F23K 1/00 (2006.01)
- F23N 1/02 (2006.01)
- F23C 1/00 (2006.01)
- F23C 9/00 (2006.01)
- F23B 80/02 (2006.01)

(52) U.S. Cl.
CPC ............... *F23B 80/02* (2013.01); *F23C 1/00* (2013.01); *F23C 9/00* (2013.01); *F23J 15/006* (2013.01); *F23K 1/00* (2013.01); *F23L 7/00* (2013.01); *F23L 7/007* (2013.01); *F23L 15/00* (2013.01); *F23N 1/022* (2013.01); *F23J 2215/50* (2013.01); *F23K 2201/10* (2013.01); *F23L 2900/07002* (2013.01); *F23L 2900/07007* (2013.01); *F23N 2027/02* (2013.01); *Y02E 20/328* (2013.01); *Y02E 20/344* (2013.01)

(58) Field of Classification Search
CPC . F23L 7/007; F23L 15/00; F23L 2900/07008; F23L 2900/07007; F23L 2900/07002; F23N 1/022; F23N 2027/02; F23J 2215/50; F23J 15/006; Y02E 20/328; Y02E 20/344; F23B 80/02; F23K 1/00; F23K 2201/40
USPC .......... 431/11, 3, 4, 5, 12; 60/39.01
IPC ............ F23D 1/00; F02C 3/22, 3/34; F23L 7/00, 15/00

(56) References Cited

U.S. PATENT DOCUMENTS

| | | | | |
|---|---|---|---|---|
| 4,491,456 A * | 1/1985 | Schlinger | ................ | C01B 3/363 252/373 |
| 4,498,289 A | 2/1985 | Osgerby | | |
| 5,572,861 A * | 11/1996 | Shao | ................ | F01K 23/068 60/39.12 |
| 5,709,077 A * | 1/1998 | Beichel | ................ | F01K 21/047 431/158 |
| 5,724,805 A | 3/1998 | Golomb et al. | | |
| 7,416,137 B2 | 8/2008 | Hagen et al. | | |
| 7,533,620 B2 | 5/2009 | Morin et al. | | |
| 8,136,740 B2 | 3/2012 | Hagen et al. | | |
| 8,505,496 B2 * | 8/2013 | Douglas | ................ | F23C 7/002 110/261 |
| 8,561,556 B2 | 10/2013 | Morin et al. | | |
| 8,845,323 B2 * | 9/2014 | Johnson | ................ | F23D 11/10 110/238 |
| 2004/0238654 A1 | 12/2004 | Hagen et al. | | |
| 2006/0130719 A1 | 6/2006 | Morin et al. | | |
| 2008/0155899 A1 | 7/2008 | Ramamurthy | | |
| 2009/0071166 A1 | 3/2009 | Hagen et al. | | |
| 2009/0193809 A1 * | 8/2009 | Schroder | ................ | F02C 3/22 60/726 |
| 2009/0199749 A1 | 8/2009 | Morin et al. | | |
| 2009/0229463 A1 * | 9/2009 | Wilson | ................ | C01B 31/10 95/134 |
| 2009/0260342 A1 * | 10/2009 | Ishiguro | ................ | F02C 1/04 60/39.511 |
| 2009/0260585 A1 * | 10/2009 | Hack | ................ | F01K 7/24 122/7 R |
| 2010/0236500 A1 * | 9/2010 | Douglas | ................ | F23C 7/002 122/22 |
| 2011/0000221 A1 * | 1/2011 | Minta | ................ | F01K 23/068 60/783 |
| 2011/0126549 A1 * | 6/2011 | Pronske | ................ | F01K 21/047 60/783 |
| 2012/0037732 A1 * | 2/2012 | Stevenson | ................ | F02C 3/20 239/600 |
| 2014/0080073 A1 * | 3/2014 | Zanganeh | ................ | F02C 3/22 431/11 |

FOREIGN PATENT DOCUMENTS

| | | |
|---|---|---|
| EP | 2 529 158 B1 | 12/2012 |
| GB | 2 365 492 A | 2/2002 |
| JP | 2011256818 A * | 12/2011 |
| WO | WO 97/07329 A1 | 2/1997 |
| WO | WO 2007/063388 A2 | 6/2007 |

OTHER PUBLICATIONS

Chinese Search Report issued in Appln. No. CN 2011800710931 dated Feb. 9, 2015 (2 pages).
European Office Action issued in Appln. No. EP 11866158-6 dated Feb. 27, 2015 (8 pages).
Chinese Office Action issued in Appln. No. CN 2011800710931 dated Mar. 25, 2015 with English translation (9 pages).
Form PCT/ISA/220 issued in PCT/CA2011/000593 dated Feb. 9, 2012 (1 page).
Form PCT/ISA/237 issued in PCT/CA2011/000593 dated Feb. 9, 2012 (3 pages).
Form PCT/ISA/210 issued in PCT/CA2011/000593 dated Feb. 9, 2012 (3 pages).

* cited by examiner

HIGH PRESSURE FOSSIL FUEL OXY-COMBUSTION SYSTEM WITH CARBON DIOXIDE CAPTURE FOR INTERFACE WITH AN ENERGY CONVERSION SYSTEM

FIELD OF THE INVENTION

This invention relates to combustion systems and methods of operating combustion systems, and in particular to a combustion system for operational connection to an energy conversion system. More particularly, the invention relates to a combustion system for oxy-firing under pressure using supercritical carbon dioxide, and a method of operating the system for interfacing with a closed supercritical carbon dioxide Brayton cycle system.

BACKGROUND OF THE INVENTION

The emissions of greenhouse gases to the atmosphere are increasing at an alarming rate, and among them carbon dioxide emissions, as a result of the increased use of fossil fuels, are a major contributor to global warming and climate change, leading to international efforts to develop low carbon energy approaches which are less dependent on fossil fuels. However, the relative costs of alternative fuels to fossil fuels present a significant disadvantage, leading to efforts to develop technologies which during the transition to low-carbon economy can use fossil fuels but without the serious effects of greenhouse gas emissions. For industrial processes, such as power generation, these efforts include improved methods of capturing carbon dioxide from the processes and increasing the efficiency of the power generation process. In the case of power generation, these methods are pre-combustion carbon dioxide capture, post-combustion carbon dioxide capture and oxy-fuel combustion with carbon dioxide capture. However, each of these methods has associated disadvantages of capital and operational costs of the carbon dioxide capture plants, and in the case of oxygen-blown gasifiers or oxy-fuel processes, the additional high costs of producing oxygen from known cryogenic air separation units. In addition to high costs of construction and operation, other disadvantages are known in relation to each of these methods, including the complexity of the technology and associated risks, and low energy efficiency compared with previous plant operation, particularly for power generation.

Proposals have been made for integration of closed Brayton cycles with a nuclear heat source, or with a solar heat source. However, each of those sources presents inherent disadvantages based on the nature of the source, and significant cost disadvantages, so that the use of a fossil fuel for the heat source remains attractive if the carbon dioxide emissions can be substantially reduced or eliminated.

It has now been found that many of the disadvantages identified above, and others, can be addressed and overcome by a simple, efficient, compact and low-emission process in a pressurized combustion system which is constructed to interface with an energy conversion system, in particular a closed supercritical carbon dioxide Brayton cycle system, or similar systems, such as, but not limited to, systems for power generation. The system and method of the invention provide for integration of a highly efficient near-zero emission pressurized oxy-fuel combustion process with the energy conversion system. The combustion systems and method of the invention can be operated with fossil fuels in their various forms, i.e. as gaseous, liquid or solid fuels.

In the system and method of the invention, the heat is provided to the energy conversion system by an interface heat exchanger, and the temperature of the combustion, and hence of the combustion product stream passing to and through the heat exchanger, can in part be moderated and controlled by the mass flow rates of the fuel and oxygen as well as selective recirculation into the combustor of part of the flue gas stream leaving the heat exchanger, so as to meet the thermal energy requirements of the energy conversion system at the heat exchanger.

It has further been found that additional efficiencies can be achieved by use of the flue gas stream to preheat the incoming fuel supply and the incoming oxygen supply. Depending on the configuration of the energy conversion system, surplus heat from that system can be used to preheat the incoming fuel and oxygen supply for the combustion system. Also further efficiencies can be achieved by using the flue gas stream to drive a prime mover connected to the circulation pump. In addition, the combustion system's high pressure operation in excess of carbon dioxide supercritical pressure, avoids the energy need for carbon dioxide exhaust stream compression for storage or use. Also the pressurized flue gas exhaust stream can be purified using less energy intensive technologies such as membranes.

SUMMARY OF THE INVENTION

The invention therefore seeks to provide a combustion system for operational connection to an energy conversion system, the combustion system comprising
  (i) a combustion means constructed and arranged for selective operation at combustion pressures exceeding atmospheric pressure and comprising a combustor having
    (a) at least one combustion chamber;
    (b) a fuel input means constructed and arranged to receive a supply of fuel at a pressure exceeding the selected combustion pressure;
    (c) an oxygen input means constructed and arranged to receive a supply of an oxygen having a purity of at least 70% and at a pressure exceeding the selected combustion pressure;
    (d) a carbon dioxide input means constructed and arranged to receive a supply of supercritical carbon dioxide at a pressure exceeding the selected combustion pressure;
    (e) at least one combustion products outlet means defining a combustor outlet flow path for removal of products of combustion from the combustion chamber and the combustor; and
    (f) at least one combustion product stream recirculation inlet means;
  (ii) an oxygen delivery means operatively connected to the oxygen input means;
  (iii) a fuel delivery means operatively connected to the fuel input means;
  (iv) at least a first heat exchanger means constructed and arranged for operational connection to the energy conversion system, having an input region, a discharge region, and at least a first flow passage defining a flow path between the input region and the discharge region for the products of combustion received from the combustor;
  (v) a combustion exhaust means comprising a flow passage;

(vi) a recirculation means operatively connected to the at least one combustion product stream recirculation inlet means and comprising at least one circulation pump; and (vii) a combustion discharge means operatively connected to the discharge region of the first heat exchanger means for removal of the products of combustion and comprising (a) a divider means for division of the products of combustion into a recirculation stream and an exhaust stream;

(b) a recirculation stream delivery means operatively connected to the recirculation means; and (c) an exhaust stream delivery means operatively connected to the combustion exhaust means.

In some embodiments, the energy conversion system is a closed Brayton cycle system having a working fluid, and the first heat exchanger means further comprises a second flow passage defining a flow path between the input region and the discharge region for a supply of the working fluid from the closed Brayton cycle system.

Preferably, wherein the oxygen input means is constructed and arranged to receive a supply of oxygen having a purity of at least 80%, more preferably at least 90%, and most preferably at least 95%.

Preferably, each of the at least one combustion chamber is constructed and arranged to be operated at a pressure of at least 10 MPa, more preferably at a pressure of between 10 and 25 MPa.

Preferably, the combustion exhaust means is constructed and arranged to be operatively connected to a conditioning means for the exhaust stream, and the conditioning means comprises a water vapour removal means and an impurity removal means for producing a carbon dioxide product stream. Preferably, the conditioning means is selected from at least one of a flash separator, a gravity separator and a membrane process means.

Preferably, the circulation means comprises at least one condensate knock out vessel located upstream of the divider means.

Preferably, the combustion system further comprises a prime mover operatively connected to the recirculation means, and preferably the prime mover is selected from at least one of a turbine, an engine, an electric motor and combinations thereof, and preferably is located within the flow passage of the combustion exhaust means.

Preferably, the combustion system further comprises a back pressure regulator operatively connected to the combustion exhaust means.

Preferably, the first heat exchanger means is selected from a printed circuit heat exchanger, a shell and tube heat exchanger and a plate type heat exchanger, more preferably a counter flow heat exchanger.

Optionally, the combustion system further comprises at least a second heat exchanger means for operational connection to the combustion exhaust means, having an input region, a discharge region, and defining a flow passage between the input region and the discharge region for the exhaust stream. Preferably, the second heat exchanger means comprises a second flow passage defining a flow path for the incoming stream of oxygen, and is selected from a printed circuit heat exchanger, a shell and tube heat exchanger and a plate type heat exchanger, preferably a counter flow heat exchanger.

Optionally, the combustion system further comprises at least a third heat exchanger means for operational connection to the combustion exhaust means downstream from the second heat exchanger and comprising a flow passage for the exhaust stream. Preferably, the third heat exchanger means is selected from a printed circuit heat exchanger, a shell and tube heat exchanger and a plate type heat exchanger, preferably a counter flow heat exchanger.

Optionally, the energy conversion system can comprise a secondary heat exchanger means, and the oxygen delivery means of the combustion system can be operatively connectible to the secondary heat exchanger means.

Optionally, the energy conversion system can comprise a tertiary heat exchanger means, and the fuel delivery means can be operatively connectible to the tertiary heat exchanger means.

Preferably, the fuel input means is constructed and arranged to receive a supply of fuel selected from the group consisting of a liquid fuel, a gaseous fuel, a solid fuel and mixtures thereof.

Where the fuel is a liquid fuel, preferably the fuel input means is constructed and arranged to receive a stream from the recirculation stream to atomize the liquid fuel.

Where the fuel is a pulverized solid fuel, preferably the fuel input means is constructed and arranged to receive a stream from the recirculation stream to carry the pulverized solid fuel.

Where the fuel is a gaseous fuel, it can comprise natural gas, or be selected from synthesis gas from a gasification process and off gases from a fuel refining process.

Where the fuel is a gaseous fuel, preferably the third heat exchanger means comprises a second flow passage defining a flow path for the incoming supply of fuel.

Optionally, the combustion system further comprises a fourth heat exchanger means operatively connected to the recirculation stream delivery means for modification of operational temperatures of the recirculation stream.

Where the fuel is a solid fuel, preferably it comprises a hydrocarbon fuel selected from at least one of coal, pulverized coal, beneficiated coal, oil, bitumen, petroleum coke, combustible waste and biomass and combinations thereof, and preferably is a pulverized solid fuel, in which case preferably the fuel input means comprises a stream of supercritical carbon dioxide to carry the pulverized solid fuel, and the fuel input means is constructed and arranged to receive a stream from the recirculation stream to carry the pulverized solid fuel.

Optionally, the supply of fuel is a slurry comprised of a pulverized solid fuel in liquid carbon dioxide, and the fuel input means further comprises a slurry feed system.

Preferably, the combustion means further comprises at least one solids removal outlet means constructed and arranged to remove non-combustible solid particles comprising at least one of fly ash, bottoming ash, slag, and non-ash particulates. Preferably, the recirculation means comprises at least one solids removal outlet means constructed and arranged to remove non-combustible solid particles, and at least one solids removal outlet means is located upstream of the first heat exchanger. Alternatively or additionally, at least one solids removal outlet means is located downstream of the first heat exchanger, and/or at least one solids removal outlet means is located upstream of the circulation pump.

The invention further seeks to provide a method of providing thermal energy to an energy conversion system, the method comprising the steps of (a) providing a combustion means constructed and arranged for selective operation at combustion pressures exceeding atmospheric pressure and comprising a combustor having at least one combustion chamber, and operatively connected to a first heat exchanger having a combustion products flow passage, the combustion means further being operatively connected to a circulation pump;

(b) connecting the first heat exchanger to the energy conversion system;

(c) selecting an operating combustion pressure;

(d) determining a required delivery temperature range for the energy conversion system and determining a target temperature range within the required delivery temperature range;

(e) delivering a supply of fuel, a supply of oxygen having a purity of at least 70% and at a pressure exceeding the selected operating combustion pressure, and concurrently selectively delivering a supply of pressurizing fluid comprising a flow of supercritical carbon dioxide to the combustor;

(f) combusting the supply of fuel in the combustion chamber in the presence of the supply of oxygen and the pressurizing fluid at the selected operating combustion pressure to produce a combustion products stream;

(g) delivering the combustion products stream to and through the first flow passage of the first heat exchanger;

(h) selectively dividing the combustion products stream leaving the first heat exchanger into a recirculation stream and an exhaust stream;

(i) delivering the recirculation stream to the combustor;

(j) monitoring the required delivery temperature range and adjusting the target temperature range in accordance with changes in the required delivery temperature range;

(k) selectively controlling and adjusting the rate of supply of fuel and oxygen and the rate of delivery of the recirculation stream to the combustor to bring and maintain the combustion products stream within the target temperature range; and (l) delivering the exhaust stream to a combustion exhaust means for removal and selective recovery.

Preferably, before step (e) the method comprises a start-up step of (d.1) preheating the combustion means to an operating temperature within the target temperature range by combusting a supply of fuel in air at ambient pressure.

Preferably, after step (d.1) and before step (e) the method comprises start-up steps of (d.2) delivering to the combustor a supply of fuel and a supply of oxygen having a purity of at least 70% with a supply of pressurizing fluid comprising a flow of carbon dioxide at a temperature less than a maximum of the selected target temperature range, and at a pressure less than the selected operating combustion pressure, and combusting the fuel to raise the temperature and pressure of the combustion means to respective selected values; and (d.3) selectively operating the circulation pump to establish the recirculation stream.

Preferably, step (h) further comprises selectively controlling a rate of removal of the exhaust stream by a back pressure regulator to control pressure in the recirculation stream.

Preferably, step (f) further comprises having a maximum of 3% oxygen in the combustion products stream measured on a dry basis.

In some embodiments, the energy conversion system is a closed Brayton cycle system having a working fluid, and the first heat exchanger further comprises a second flow passage defining a flow path for a supply of the working fluid to receive heat from the combustion products stream delivered in step (g) to the first flow passage. In these embodiments, preferably step (k) includes controlling and adjusting the rate of supply of fuel and oxygen and the rate of delivery of the recirculation stream to the combustor in response to changes in a mass flow rate of the working fluid through the first heat exchanger and changes within the required delivery temperature range.

Preferably, the supply of oxygen in step (d) comprises a supply of oxygen having a purity of at least 80%, more preferably at least 90%, most preferably at least 95%.

Preferably, step (c) comprises selecting an operating combustion pressure of at least 10 MPa, more preferably between 10 and 25 MPa.

Preferably, the method further comprises, before step (e), the step of (c.1) preheating the oxygen, and preferably, step (c.1) comprises providing a second heat exchanger to the combustion exhaust means, delivering the exhaust stream to and through the second heat exchanger, and delivering the supply of oxygen to and through the second heat exchanger to be heated by the exhaust stream.

Preferably, step (g) comprises delivering the fluid products of combustion to the first flow passage at a temperature of at least 5° C. greater than a maximum of the required delivery temperature range.

Preferably, step (i) further comprises compressing the recirculation portion to a pressure exceeding the operating combustion pressure selected in step (c).

Where the delivering a supply of fuel in step (e) comprises delivering natural gas, preferably the method further comprises, before step (e), the step of (c.2) preheating the supply of fuel. More preferably, step (c.2) comprises providing a third heat exchanger to the combustion exhaust means, delivering the exhaust stream to and through the third heat exchanger, and delivering the supply of fuel to and through the third heat exchanger to be heated by the exhaust stream.

Preferably the delivering a supply of fuel in step (e) comprises delivering a supply of fuel selected from the group consisting of a liquid fuel, a gaseous fuel, a solid fuel and mixtures thereof. Where the fuel is a solid fuel, preferably the delivering a supply of fuel in step (e) comprises delivering a supply of a hydrocarbon fuel selected from at least one of coal, pulverized coal, beneficiated coal, oil, bitumen, petroleum coke, combustible waste, biomass and combinations thereof. Where the supply of fuel is a pulverized solid fuel, preferably step (e) further comprises providing the pulverized solid fuel in a stream of supercritical carbon dioxide, or in liquid carbon dioxide in slurry form.

Preferably, step (k) further comprises bringing the exhaust stream to ambient temperature. Preferably, step (k) also further comprises conditioning the exhaust stream by removing water vapour and impurities from the exhaust stream to produce a carbon dioxide product stream within a selected purity range, and the carbon dioxide product stream is in a form selected from supercritical and subcritical.

Preferably, step (a) further comprises providing at least one solids removal means to the combustor. More preferably, step (a) further comprises providing at least one solids removal means and at least one solids outlet between the combustor and the first heat exchanger, and the method further comprises before step (g) the step of (f.1) passing the combustion products stream through the solids removal means and discharging removed solids through the at least one solids outlet.

Preferably, the method further comprises before step (i) the step of selectively removing solids from the recirculation stream. More preferably, step (a) further comprises providing at least one solids removal means to the combustion means upstream of the circulation pump.

Preferably, step (a) further comprises providing a recirculation stream heat exchanger and step (i) further comprises selectively passing at least part of the recirculation stream through the recirculation stream heat exchanger to modify temperatures of the recirculation stream.

Optionally, step (a) further comprises providing a bypass means to the first heat exchanger, and step (g) further comprises selectively passing at least part of the combustion products stream through the bypass means instead of through the first heat exchanger.

BRIEF DESCRIPTION OF THE DRAWINGS

The invention will now be described in relation to the drawings, in which.

DETAILED DESCRIPTION OF THE DRAWINGS

Figure 1:
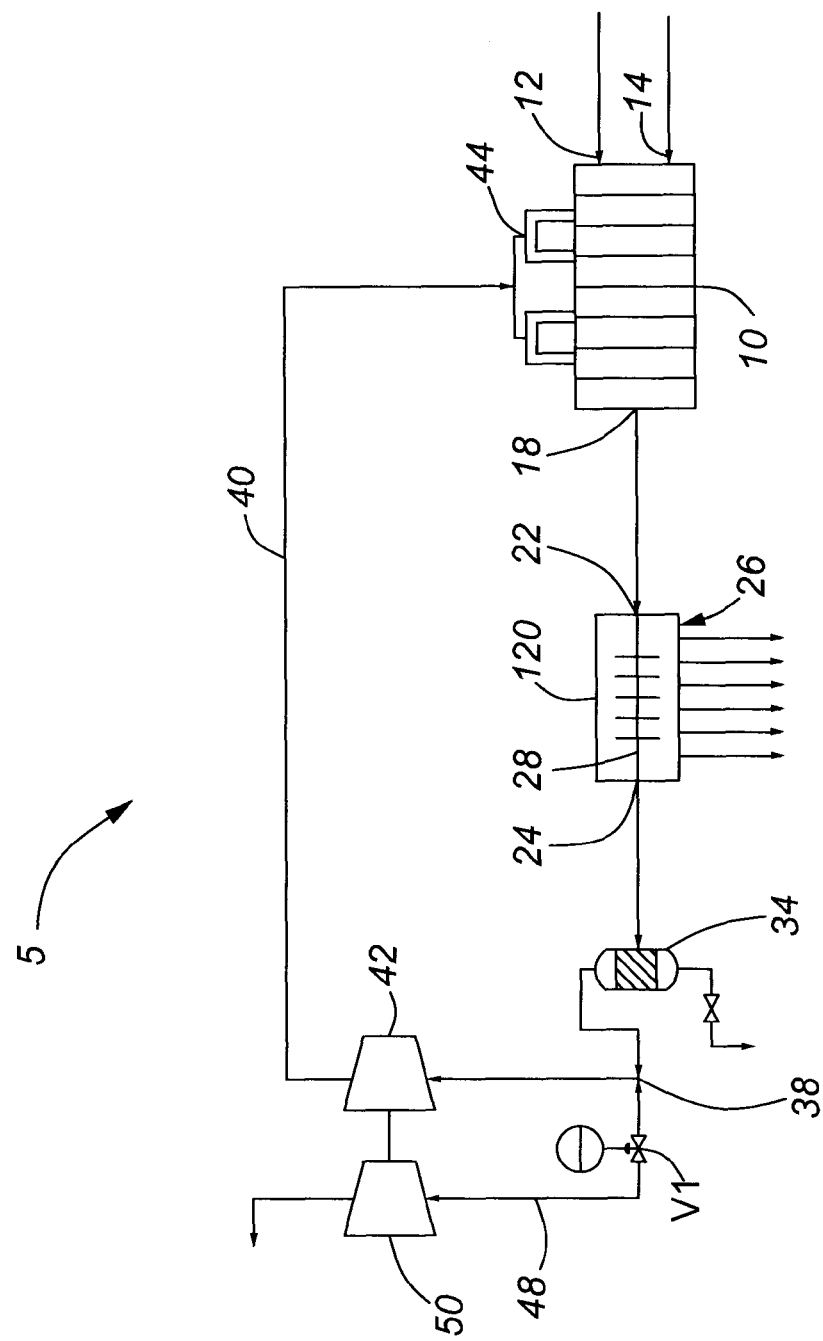
FIG. 1 is a schematic representation of an embodiment of the invention.

Referring first to FIG. 1, a first embodiment of a combustion system 5 of the invention is shown in a schematic representation, comprising a system 5 constructed to be suitable for connected to any energy conversion system (not shown) which is designed to receive thermal energy by contact. In this embodiment, combustion system 5 comprises a combustor 10, shown as having a plurality of regions, designed for pressurized oxy-firing, and having an oxygen inlet 12, a fuel inlet 14, and a combustion products outlet 18, from which the stream of flue gas can pass to the inlet 22 of heat exchanger 120, and along path 28 to the heat exchanger outlet 24. Heat from the flue gas stream passing through heat exchanger 120 is received by the energy conversion system from contact surface 26 by any suitable means (not shown).

After passing through heat exchanger 120, the cooler stream of flue gas passes to condensate drum 34, which removes any liquid during start-up. The flow path of the flue gas stream continues to divider 38, at which recirculation line 40 is separated from exhaust line 48. During operation, as discussed further below, the rate of recirculation is selectively changed for moderation of the temperature of the combustor, and any residual part of the flue gas stream not delivered into recirculation line 40 is passed into the exhaust stream in line 48, and through a prime mover, shown here as turbine 50, to be further processed as a carbon dioxide product.

The recirculation stream passed into recirculation line 40 is pumped by circulation pump 42, and delivered to selected ones of the regions of combustor 10, through respective ones of the recirculation inlets 44 provided to combustor 10.

Figure 2:
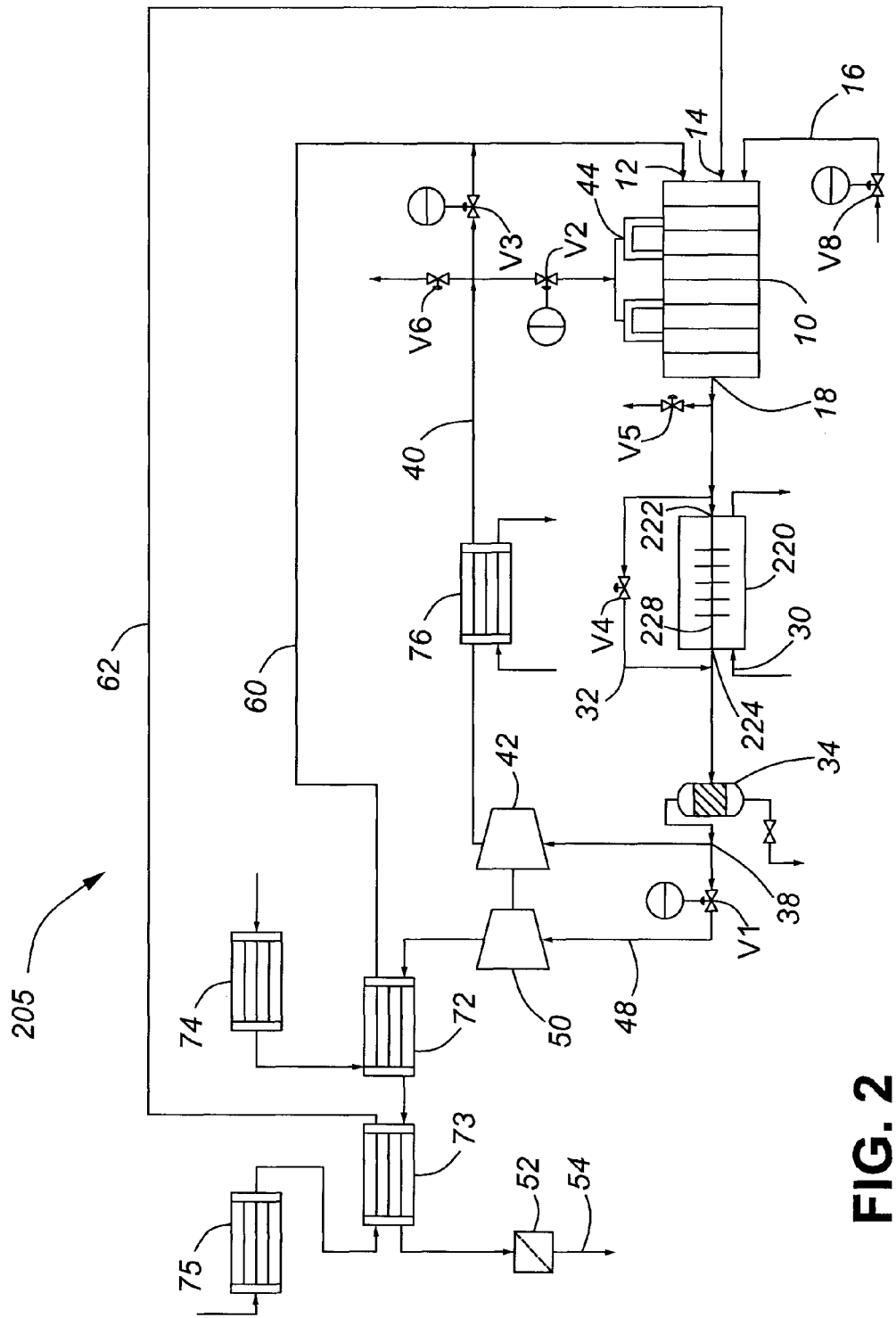
FIG. 2 is a schematic representation of a second embodiment of the invention, for a gaseous fuel.

Referring now to FIG. 2, a combustion system 205 in a second embodiment of the invention is shown, designed for use with a gaseous fuel supply. The configuration of the primary components of combustion system 205 is similar to that for combustion system 5 in FIG. 1. However, the flue gas stream leaving combustor 10 at outlet 18 passes to inlet 222 to pass into and through heat exchanger 220 in a first path 228, while working fluid from an energy conversion system (not shown) passes in the opposite direction in a second path 30 through heat exchanger 220, to receive thermal energy from the flue gas stream in first path 228. At the same time, if required for load management, as discussed further below, part of the flue gas stream leaving combustor 10 at outlet 18 can be diverted around heat exchanger 220 in optional by-pass line 32, and rejoin the flue gas stream leaving heat exchanger 220 at outlet 224.

After divider 38, the recirculation stream is pumped by pump 42 in recirculation line 40 in the same manner as shown in FIG. 1. However, in this embodiment, recirculation line 40 is provided with optional heat exchanger 76, which can be used selectively for removing part of the thermal energy of the recirculation stream for load management. A portion of the recirculation stream can be separated to join the stream of the oxygen supply in line 60, instead of passing directly into the combustor at recirculation inlets 44. For start-up of this embodiment, pressurized carbon dioxide is supplied to the combustor through line 16.

FIG. 2 also shows options for the exhaust stream divided from the recirculation stream at divider 38. After expansion through a prime mover, shown as turbine 50, the exhaust stream optionally can be passed into and through heat exchanger 72, through which the oxygen supply also passes, so that excess thermal energy in the exhaust stream can be used to partially preheat the oxygen supply. As a further alternative or additional option, the exhaust stream can be passed into and through heat exchanger 73, and used to preheat the gaseous fuel supply in line 62. Thereafter, the exhaust stream can be passed into suitable purification means 52, for the removal of contaminants, before passing into product line 54.

As still further options, excess heat from the energy conversion system can be used to contribute to preheating the oxygen supply in line 60 through heat exchanger 74, and to preheating the gaseous fuel supply in line 62 through heat exchanger 75.

Figure 3:
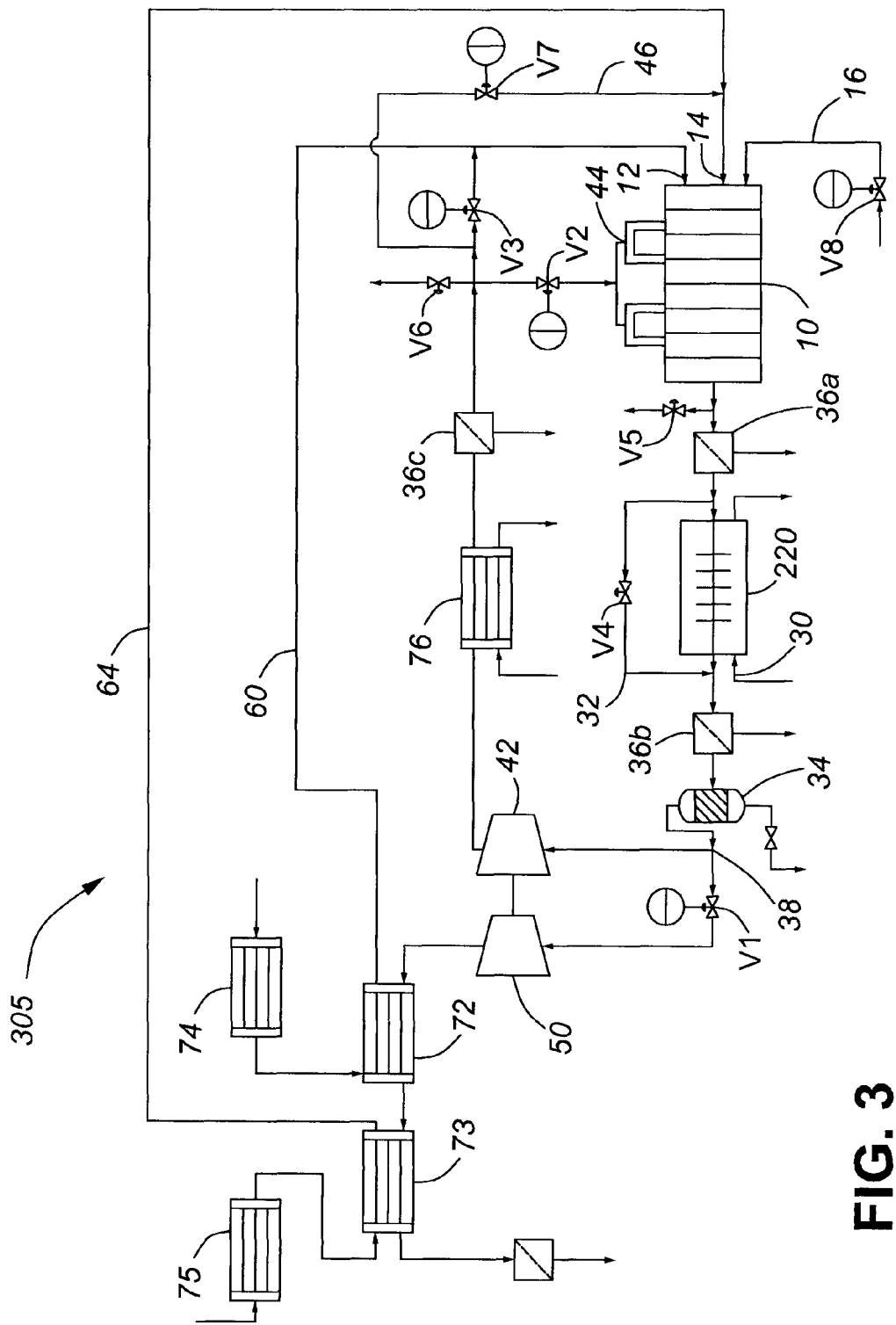
FIG. 3 is a schematic representation of a second embodiment of the invention, for a liquid fuel.

Referring now to FIG. 3, a combustion system 305 in a third embodiment of the invention is shown in a schematic representation, designed for use with a liquid fuel supply. This embodiment is similar in many respects to the embodiment shown in FIG. 2 for a gaseous supply, including the optional bypass line 32 for load management, the start-up line 16 for supply of pressurized carbon dioxide, and heat exchangers 72, 73, 74, 75 and 76. In addition, part of the recirculation stream in line 40 can be separated to be added to the supply of liquid fuel in line 64, to atomize the fuel before delivery into combustor 10 at input 14; alternatively or additionally, part of the recirculation stream can be separated and added to the oxygen supply in line 60 in the same manner as shown in FIG. 2. Further, to deal with impurities from the liquid fuel supply, ash removal means, shown here as 36a, 36b and 36c, can be provided at appropriate locations in the system.

Figure 4:
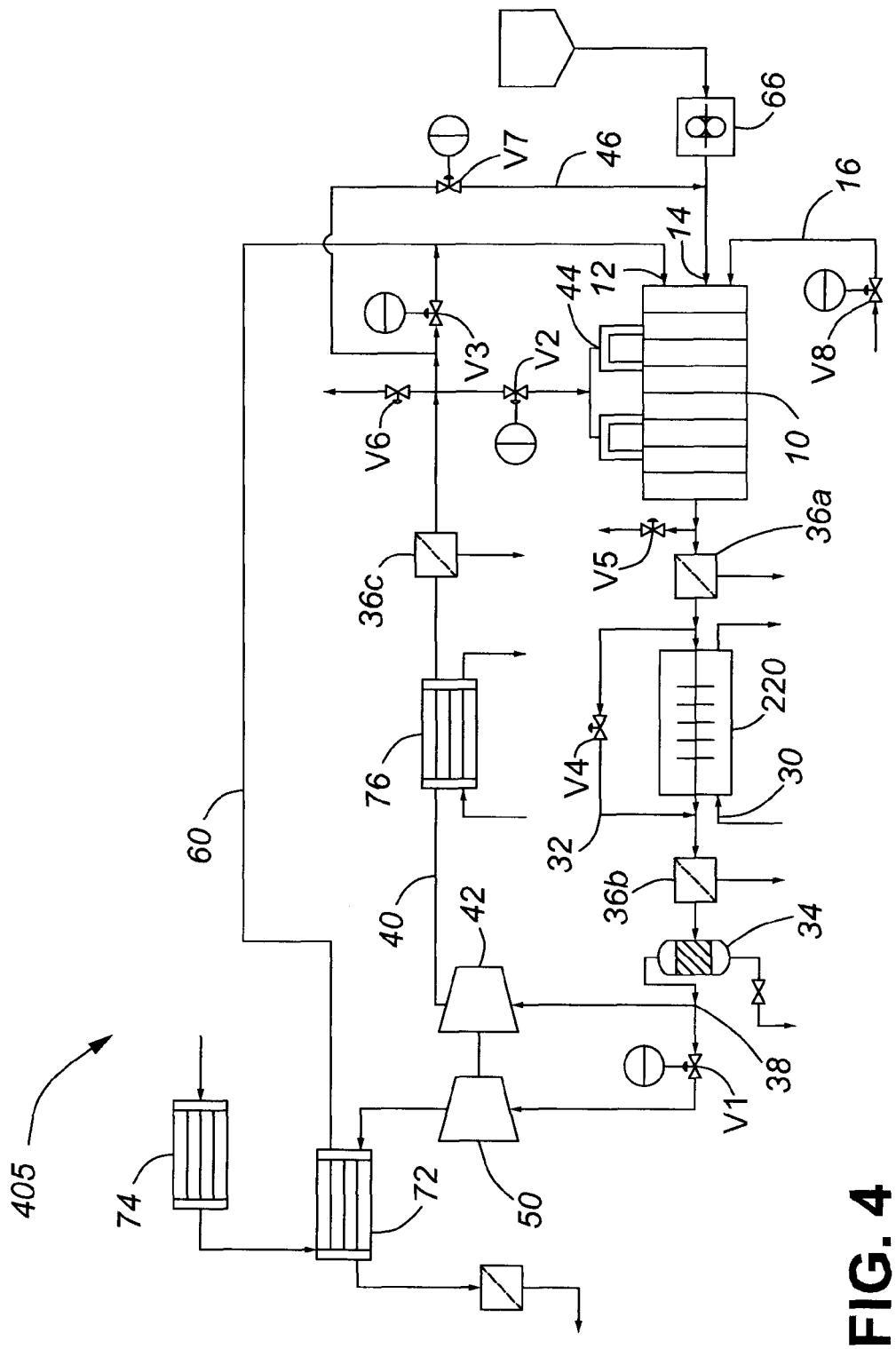
FIG. 4 is a schematic representation of a third embodiment of the invention, for a solid fuel.

Referring now to FIG. 4, a combustion system 405 in a fourth embodiment of the invention is shown in a schematic representation, designed for use with a solid fuel supply. In this embodiment, the solid fuel is delivered at feeder 66. Optionally, part of the recirculation stream can be separated into line 46 and used to carry the solid fuel from feeder 66 into inlet 14 of combustor 10. In this embodiment also, optional heat exchangers 72 and 74 can be used for preheating the oxygen supply in line 60. In the same manner as shown in FIG. 3, to deal with impurities from the solid fuel supply, ash removal means, shown here as 36*a*, 36*b* and 36*c*, can be provided at appropriate locations in the system.

Figure 5:
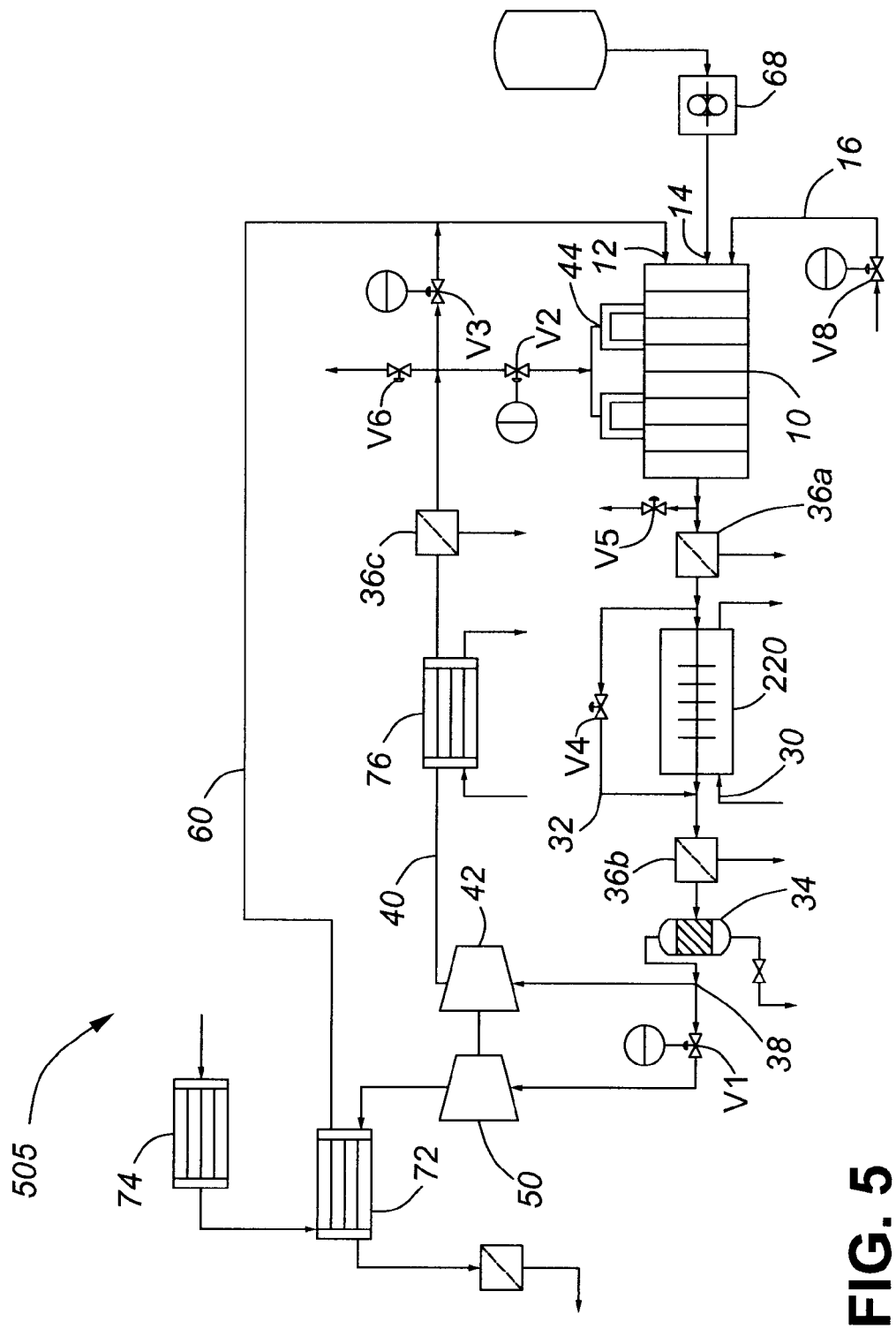
FIG. 5 is a schematic representation of a fourth embodiment of the invention, for a slurry fuel.

Referring now to FIG. 5, a combustion system 505 in a fifth embodiment of the invention is shown in a schematic representation, designed for use with a fuel supply in slurry form. In this embodiment, the slurry is delivered from feeder 68 directly into combustor 10 at inlet 14. The features of ash removal means are provided at appropriate locations, such as at 36*a*, 36*b*, 36; and the optional heat exchangers 72, 74 and 76 can be provided in the same manner as shown in FIG. 4.

Referring now to FIGS. 2 to 5, the start-up process will consist of the following steps: The system can be preheated by closing valves V2, V3 and V5, and partially opening valves V1 and V6, and combusting solid, liquid or gaseous fuel with air at ambient pressure, or suitable alternative means, to bring it to the operating temperature of the system, and running circulation pump 42 using a motor while modulating valves V1 and V6 to optimize the rate of heating in different sections of the system. For example, pre-heating can be performed by combusting liquid or gaseous fuel with air at ambient pressure. Suitable alternative means would include the use of external electrical or solar means, or other means. When the preheating is completed, the air and fuel supply are isolated, and valve V6 is closed.

Following this initial preheating, there are various options for completion of the start-up.

Firstly, for systems to be operated with gaseous fuel, as in FIG. 2, the next steps are as follows:

1. Pre-pressurize the system with carbon dioxide at a pressure lower than or equal to the operating pressure and at a temperature lower than or equal to the operating temperature of the system;

2. Start the circulation pump to establish the recirculation stream;

3. Start the flow of fuel and oxygen, initiate combustion, and increase the flow rates until the system reaches the normal operating values, while modulating control valve V1 until the steady state operating pressure and temperature is reached; and 4. While the system is reaching steady state conditions, also modulate control valves V2 and V3 to optimize the combustion performance.

As an alternative method for systems to be operated with gaseous fuel, the next steps can be as follows:

1. Start the flow of fuel and oxygen and a temperature moderating stream of pressurized carbon dioxide from an external source, initiate combustion, and increase the flow rates until the system reaches the normal operating values, while modulating control valve V1 until the steady state operating pressure and temperature is reached;

2. Concurrently, start the circulation pump and continue circulation to fully establish the recirculation stream at steady state conditions, while gradually reducing the external supply of pressurized carbon dioxide;

3. While the system is reaching steady state conditions, also modulate control valves V2 and V3 to optimize the combustion performance.

Secondly, for systems to be operated with liquid fuel, as in FIG. 3, the next steps are as follows:

1. Pre-pressurize the system with carbon dioxide at a pressure lower than or equal to the operating pressure and at a temperature lower than or equal to the operating temperature of the system;

2. Start the circulation pump to establish the recirculation stream;

3. Start the flow of oxygen and fuel, by atomizing the fuel using a pressurized carbon dioxide stream from an external source supplied through control valve V8, initiate combustion, and increase the flow rates until the system reaches the normal operating values, while modulating control valve V1 until the steady state operating pressure and temperature is reached. Concurrently, as the pressure is further built up in the system, gradually close valve V8 and open up valve V7; and 4. While the system is reaching steady state conditions, also modulate control valves V2, V3 and V7 to optimize the combustion performance.

As a further alternative method for systems to be operated with liquid fuel, the steps can be as follows:

1. Start the flow of oxygen and fuel and a temperature moderating stream of pressurized carbon dioxide from an external source through control valve V8, initiate combustion, and increase the flow rates until the system reaches the normal operating values, while modulating control valve V1 until the steady state operating pressure and temperature is reached. Concurrently, as the pressure is further built up in the system, gradually close valve V8 and open up valve V7;

2. Concurrently start the circulation pump and continue circulation to fully establish the recirculation stream at steady state conditions, while gradually reducing the external supply of pressurized carbon dioxide; and 3. While the system is reaching steady state conditions, also modulate control valves V2, V3 and V7 to optimize the combustion performance.

During operation, there are various methods of load management of the system, in response to the requirements of the energy conversion system to which thermal energy is supplied through heat exchanger 220. These methods and options are based on controlling the amount of heat being transferred to the energy conversion system through heat exchanger 220, while the energy conversion system experiences load variations. The following options can be implemented individually or in combination for gaseous, liquid and solid fuels (as shown variously in FIGS. 2 to 5):

Introduce a new heat exchanger HX6 to modulate the temperature of the recirculation stream within the target temperature range.

Introduce a bypass means around the HX1 with a modulating valve V4 to control the flow rate of the bypass stream.

Introduce an inventory control means through the use of a relief valve V5 to control the excess pressure, temperature, and mass flow rate within the system.

Modulate the fuel and O2 flow rates to follow the load variation in the energy conversion system.

Modulate the circulation pump to control the mass flow rate of the recirculation stream.

We claim:

1. A combustion system for operational connection to an energy conversion system, wherein the energy conversion system is a closed Brayton cycle system having a working fluid, the combustion system comprising
   (i) a combustion unit constructed and arranged for selective operation at combustion pressures exceeding atmospheric pressure and comprising a combustor having
      (a) at least one combustion chamber;
      (b) a fuel input inlet constructed and arranged to receive a supply of fuel at a pressure exceeding the selected combustion pressure;
      (c) an oxygen input inlet constructed and arranged to receive a supply of an oxygen having a purity of at least 70% and at a pressure exceeding the selected combustion pressure;

(d) a carbon dioxide input inlet constructed and arranged to receive a supply of supercritical carbon dioxide at a pressure exceeding the selected combustion pressure;

(e) at least one combustion products outlet defining a combustor outlet flow path for removal of products of combustion from the combustion chamber and the combustor; and (f) at least one combustion product stream recirculation inlet;

(ii) an oxygen delivery unit operatively connected to the oxygen input inlet;

(iii) a fuel delivery unit operatively connected to the fuel input inlet;

(iv) at least a first heat exchanger constructed and arranged for operational connection to the energy conversion system, having an input region, a discharge region, and at least a first flow passage defining a flow path between the input region and the discharge region for the products of combustion received from the combustor;

(v) a combustion exhaust outlet comprising a flow passage;

(vi) a recirculation loop operatively connected to the at least one combustion product stream recirculation inlet and comprising at least one circulation pump and having a recirculation inlet; and (vii) a combustion discharge unit operatively connected to the discharge region of the first heat exchanger for removal of the products of combustion and comprising
  (a) a divider for division of the products of combustion into a recirculation stream and an exhaust stream;
  (b) a recirculation stream delivery unit operatively connected to the recirculation inlet; and
  (c) an exhaust stream delivery unit operatively connected to the combustion exhaust outlet and the energy conversion system.

2. A combustion system according to claim 1, wherein the first heat exchanger further comprises a second flow passage defining a flow path between the input region and the discharge region for a supply of the working fluid from the closed Brayton cycle system.

3. A combustion system according to claim 1, wherein the oxygen input inlet is constructed and arranged to receive a supply of oxygen having a purity of at least 80%.

4. A combustion system according to claim 1, wherein each of the at least one combustion chamber is constructed and arranged to be operated at a pressure of at least 10 MPa.

5. A combustion system according to claim 1, wherein the combustion exhaust outlet is constructed and arranged to be operatively connected to a conditioning unit for the exhaust stream, wherein the conditioning unit comprises a water vapour removal device and an impurity removal device for producing a carbon dioxide product stream, and the conditioning unit is selected from at least one of a flash separator, a gravity separator and a membrane processor.

6. A combustion system according to claim 1, further comprising a prime mover operatively connected to the recirculation loop.

7. A combustion system according to claim 6, wherein the prime mover is selected from at least one of a turbine, an engine, an electric motor and combinations thereof.

8. A combustion system according to claim 6, wherein the prime mover is located within the flow passage of the combustion exhaust outlet.

9. A combustion system according to claim 1, further comprising at least a second heat exchanger for operational connection to the combustion exhaust outlet, having an input region, a discharge region, and defining a flow passage between the input region and the discharge region for the exhaust stream, wherein the second heat exchanger further comprises a second flow passage defining a flow path for the incoming stream of oxygen, and is selected from a printed circuit heat exchanger, a counter flow printed circuit heat exchanger, a shell and tube heat exchanger, a counter flow shell and tube heat exchanger, a plate type heat exchanger and a counter flow plate type heat exchanger.

10. A combustion system according to claim 9, further comprising at least a third heat exchanger for operational connection to the combustion exhaust outlet downstream from the second heat exchanger and comprising a flow passage for the exhaust stream, wherein the third heat exchanger is selected from a printed circuit heat exchanger, a counter flow printed circuit heat exchanger, a shell and tube heat exchanger, a counter flow shell and tube heat exchanger, a plate type heat exchanger and a counter flow plate type heat exchanger.

11. A combustion system according to claim 1, wherein the energy conversion system comprises a secondary heat exchanger, and the oxygen delivery means is operatively connectible to the secondary heat exchanger.

12. A combustion system according to claim 1, wherein the energy conversion system comprises a tertiary heat exchanger, and the fuel delivery means is operatively connectible to the tertiary heat exchanger.

13. A combustion system according to claim 1, wherein the fuel input inlet is constructed and arranged to receive a supply of fuel selected from the group consisting of a liquid fuel, wherein the fuel input is constructed and arranged to receive a stream from the recirculation stream to atomize the liquid fuel; a gaseous fuel selected from natural gas, synthesis gas from a gasification process and off gases from a fuel refining process; a pulverized solid fuel, wherein the fuel input inlet is constructed and arranged to receive a stream from the recirculation stream to carry the pulverized solid fuel; and mixtures of said liquid fuel, said gaseous fuel and said solid fuel.

14. A combustion system according to claim 10, wherein the third heat exchanger comprises a second flow passage defining a flow path for the incoming supply of fuel.

15. A combustion system according to claim 13, wherein the supply of fuel is a pulverized solid fuel, having a particle size of less than about 300 micron, and wherein the fuel comprises the pulverized solid fuel carried by a stream of supercritical carbon dioxide or the fuel comprises the pulverized solid fuel carried by a stream from the recirculation stream.

16. A combustion system according to claim 15, wherein the supply of fuel is a slurry of a pulverized solid fuel in liquid carbon dioxide, and the fuel delivery unit further comprises a slurry feed system.

17. A combustion system according to claim 15, wherein the particle size of the pulverized solid fuel is less than about 75 micron.

18. A combustion system according to claim 17, wherein the particle size of the pulverized solid fuel is less than about 5 micron.

19. A combustion system according to claim 13, wherein the combustion unit further comprises at least one solids removal outlet device constructed and arranged to remove non-combustible solid particles comprising at least one of fly ash, bottoming ash, slag, and non-ash particulates.

20. A combustion system according to claim 13, wherein the recirculation loop comprises at least one solids removal outlet device constructed and arranged to remove non-combustible solid particles.

21. A combustion system according to claim 20, wherein one of the at least one solids removal outlet device is located upstream of the first heat exchanger.

22. A combustion system according to claim 20, wherein each of the solids removal outlet device is upstream of the circulation pump.

23. A combustion system according to claim 1, further comprising a fourth heat exchanger operatively connected to the recirculation stream delivery unit for modification of operational temperatures of the recirculation stream.

24. A method of providing thermal energy to an energy conversion system, wherein the energy conversion system is a closed Brayton cycle system having a working fluid, the method comprising the steps of
   (a) providing a combustion unit constructed and arranged for selective operation at combustion pressures exceeding atmospheric pressure and comprising a combustor having at least one combustion chamber, and operatively connected to a first heat exchanger having a combustion products flow passage, the combustion unit further being operatively connected to a circulation pump;
   (b) connecting the first heat exchanger to the energy conversion system;
   (c) selecting an operating combustion pressure;
   (d) determining a required delivery temperature range for the energy conversion system and determining a target temperature range within the required delivery temperature range;
   (e) delivering a supply of fuel, a supply of oxygen having a purity of at least 70% and at a pressure exceeding the selected operating combustion pressure, and concurrently selectively delivering a supply of pressurizing fluid comprising a flow of supercritical carbon dioxide to the combustor;
   (f) combusting the supply of fuel in the combustion chamber in the presence of the supply of oxygen and the pressurizing fluid at the selected operating combustion pressure to produce a combustion products stream;
   (g) delivering the combustion products stream to and through the first flow passage of the first heat exchanger;
   (h) selectively dividing the combustion products stream leaving the first heat exchanger into a recirculation stream and an exhaust stream;
   (i) delivering the recirculation stream to the combustor;
   (j) monitoring the required delivery temperature range and adjusting the target temperature range in accordance with changes in the required delivery temperature range;
   (k) selectively controlling and adjusting the rate of supply of fuel and oxygen and the rate of delivery of the recirculation stream to the combustor to bring and maintain the combustion products stream within the target temperature range; and
   (l) delivering the exhaust stream to a combustion exhaust unit for removal and selective recovery.

25. A method according to claim 24, further comprising before step (e) start-up steps of
   (d.1) preheating the combustion unit to an operating temperature within the target temperature range by combusting a supply of fuel in air at ambient pressure;
   (d.2) delivering to the combustor a supply of fuel and a supply of oxygen having a purity of at least 70% with a supply of pressurizing fluid comprising a flow of carbon dioxide at a temperature less than a maximum of the selected target temperature range, and at a pressure less than the selected operating combustion pressure, and combusting the fuel to raise the temperature and pressure of the combustion unit to respective selected values; and
   (d.3) selectively operating the circulation pump to establish the recirculation stream.

26. A method according to claim 24, wherein the first heat exchanger further comprises a second flow passage defining a flow path for a supply of the working fluid to receive heat from the combustion products stream delivered in step (g) to the first flow passage.

27. A method according to claim 26, wherein step (k) includes controlling and adjusting the rate of supply of fuel and oxygen and the rate of delivery of the recirculation stream to the combustor in response to changes in a mass flow rate of the working fluid through the first heat exchanger and changes within the required delivery temperature range.

28. A method according to claim 24, wherein the supply of oxygen in step (d) comprises a supply of oxygen having a purity of at least 80%.

29. A method according to claim 24, wherein step (c) comprises selecting an operating combustion pressure of between 7.4 and 25 MPa.

30. A method according to claim 24, further comprising, before step (e), the step of (c.1) preheating the oxygen.

31. A method according to claim 30, wherein step (c.1) comprises providing a second heat exchanger to the combustion exhaust unit, delivering the exhaust stream to and through the second heat exchanger, and delivering the supply of oxygen to and through the second heat exchanger to be heated by the exhaust stream.

32. A method according to claim 24, wherein the delivering a supply of fuel in step (e) comprises delivering natural gas, the method further comprising, before step (e), the step of (c.2) preheating the supply of fuel.

33. A method according to claim 32, wherein step (c.2) comprises providing a third heat exchanger to the combustion exhaust unit, delivering the exhaust stream to and through the third heat exchanger, and delivering the supply of fuel to and through the third heat exchanger to be heated by the exhaust stream.

34. A method according to claim 24, wherein the delivering a supply of fuel in step (e) comprises delivering a supply of fuel selected from the group consisting of a liquid fuel, a gaseous fuel, a solid fuel and mixtures thereof, wherein the fuel is a hydrocarbon fuel selected from at least one of coal, pulverized coal, beneficiated coal, oil, bitumen, petroleum coke, combustible waste, biomass, natural gas, synthesis gas from a gasification process and off gases from a fuel refining process and combinations thereof.

35. A method according to claim 34, wherein step (e) further comprises providing the supply of fuel as pulverized solid fuel in a stream of supercritical carbon dioxide.

36. A method according to claim 34, wherein step (e) comprises delivering the supply of fuel as pulverized solid fuel as a slurry in liquid carbon dioxide.

37. A method according to claim 24, wherein step (l) further comprises bringing the exhaust stream to ambient temperature.

38. A method according to claim 24, wherein step (k) further comprises conditioning the exhaust stream by removing water vapour and impurities from the exhaust stream to produce a carbon dioxide product stream within a selected purity range.

39. A method according to claim 38, wherein the carbon dioxide product stream is in a form selected from supercritical and subcritical.

40. A method according to claim 24, wherein step (a) further comprises providing at least one solids removal device and at least one solids outlet between the combustor and the first heat exchanger, and the method further comprises before step (g) the step of (f.1) passing the combustion products stream through the solids removal device and discharging removed solids through the at least one solids outlet.

41. A method according to claim 24, wherein step (a) further comprises providing at least one solids removal device to the combustion means upstream of the circulation pump.

42. A method according to claim 24, wherein step (a) further comprises providing a recirculation stream heat exchanger and step (i) further comprises selectively passing at least part of the recirculation stream through the recirculation stream heat exchanger to modify temperatures of the recirculation stream.

43. A method according to claim 24, wherein step (a) further comprises providing a bypass device to the first heat exchanger, and step (g) further comprises selectively passing at least part of the combustion products stream through the bypass device instead of through the first heat exchanger.

* * * * *